(12) United States Patent
Taku

(10) Patent No.: US 6,367,499 B2
(45) Date of Patent: Apr. 9, 2002

(54) SAFETY VALVE

(75) Inventor: Chiba Taku, Fuchu (JP)

(73) Assignee: Hamai Industries Limited (JP)

( * ) Notice: Subject to any disclaimer, the term of this patent is extended or adjusted under 35 U.S.C. 154(b) by 0 days.

(21) Appl. No.: 09/758,773

(22) Filed: Jan. 11, 2001

(30) Foreign Application Priority Data

Mar. 2, 2000 (JP) ........................................ 2000-057760

(51) Int. Cl.[7] .............................................. F16K 17/38
(52) U.S. Cl. ............................. 137/72; 137/79; 251/282
(58) Field of Search ...................... 137/72, 79; 251/282

(56) References Cited

U.S. PATENT DOCUMENTS

| | | | | | |
|---|---|---|---|---|---|
| 1,983,514 A | * | 12/1934 | Lovekin | ........................ | 137/72 |
| 2,620,815 A | * | 12/1952 | Margraf et al. | ............ | 137/72 X |
| 2,671,461 A | * | 3/1954 | Hebert | ......................... | 137/72 |
| 4,365,643 A | * | 12/1982 | Masclet et al. | ............ | 137/72 X |
| 5,511,576 A | * | 4/1996 | Borland | ........................ | 137/72 |
| 5,632,297 A | * | 5/1997 | Sciullo et al. | ............. | 137/72 X |

* cited by examiner

*Primary Examiner*—John Rivell
(74) *Attorney, Agent, or Firm*—Norris, McLaughlin, & Marcus P.A.

(57) ABSTRACT

A safety valve has a valve body, a piston contained in the valve body, a soluble alloy filled between said piston and said valve body, and a spring inserted between the piston and the valve body. The piston includes a path connecting both ends thereof, and has a first gas pressure receiving surface and a second gas pressure receiving surface at both ends. The first and second gas pressure receiving surfaces have the same area; the piston works as a balanced piston where the gas pressure in the fuel tank functions in reverse directions. As a result, no gas pressure is applied to the soluble alloy but only the energizing force of the spring is applied. Therefore, the pressure applied to the soluble alloy can be kept constant without regard to the increase of the gas pressure.

4 Claims, 4 Drawing Sheets

SAFETY VALVE

BACKGROUND OF THE INVENTION

1) Field of the Invention

The present invention relates to a safety valve using a soluble plug, more particularly, relates to a safety valve for use in a fuel tank of automobiles which are powered with combustible gas as a fuel.

2) Related Art Statement

For a fuel tank mounted in automobiles which uses combustible gas, such as natural gas, as a fuel for engines, often used a plastic tank in order to make the weight lighter. A tank made of plastic is light in weight, however, does not have sufficient strength against an increase of heat or pressure, compared to a metal tank.

Further, automobiles have factors in increasing the temperature of the body itself due to heat from an engine, or sunshine, and therefore, the temperature in the place where the fuel tank is arranged becomes remarkably higher than the temperature outside of the body.

Therefore, a safety valve is used in fuel tanks of automobiles in order to prevent the explosion of a tank caused by an increase of inner pressure which accompanies an increase of temperature of a tank. This safety valve is arranged to melt when the temperature in the atmosphere around the valve increases and the valve is open.

FIGS. 1 and 2 are cross sectional views showing a construction of a conventional safety valve for use in fuel tanks of automobiles. The safety valve 9 shown in FIGS. 1 and 2 comprises a valve body 91 and a path 92, which is formed through the body 91 for exhausting a gas, and a soluble material 93, which is filled in the path 92 as a soluble plug.

The conventional safety valve 9 functions in such a manner that when the temperature around the valve 9 increases to a predetermined value, the soluble material 93 melts; the melted material 93 is then pushed out to the outside of the path 92 by the pressure of a gas in the tank; the path 92 is connected to the outside of the valve 9, and the gas is then exhausted through the valve 9.

According to the construction of the conventional safety valve, however, the gas pressure is constantly applied to the soluble material 93. Therefore, the soluble material 93 of the soluble plug causes a creep and is exhausted out from the valve body 91 over a long period of time. Further, a creep is apt to be generated when the temperature of the soluble plug 93 increases.

The safety valve, where the soluble material 93 is exhausted as shown in FIG. 5, cannot realize an initially designed function thereof any more.

It is considered to make the cross sectional area of the path 92 smaller in order to make the area of the plug against which the gas pressure is applied smaller for restricting the generation of creep. However, this construction also makes the cross sectional area of an exit path for exhausting a gas small, so that a sufficient area of the gas flow path, which is necessary to exhaust the gas, cannot be secured. On the other hand, in order to assure the sufficient area of the path for exhausting the gas, the dimension of the safety valve itself should be made large.

Automobiles having a combustion engine have many factors in that the temperature of the fuel tank increases.

For instance, under the circumstance that an atmospheric temperature is 40° C., first, the temperature of the surface of the fuel tank increases to about 52° C. under direct sunshine: second, the temperature further increase by 5 to 10° C. due to the by-product heat of the engine: third, in case the automobiles use natural gas as a fuel, when the fuel is filled into the fuel tank, the temperature in the tank increases. In such a case, for instance, the fuel is normally filled into the tank until the inner pressure of the tank increases from 20 atmosphere to about 200 atmosphere in a short period (3–5 minutes), when the gas is charged in the tank; then the gas charge increases the temperature inside the tank by about 15° C. due to adiabatic compression.

If all of the factors occur at once, the temperature in the tank, becomes 72–78° C.; in addition to this, abut 200 atmospheric pressure is applied against the safety valve. If such a condition is maintained that a high pressure is applied and the temperature of the tank becomes so high, the conventional safety valve becomes likely to cause more creep.

SUMMARY OF THE INVENTION

The present invention has for its purpose to provide a safety valve in which the leak of a soluble plug due to creep is restricted and can be used for a long term. In order to carry out this purpose, the safety valve according to the invention, which is attached to a gas flow path in a gas container mounted in a movable body or in the vicinity of the container, comprises a valve body having an opening which opens to a gas atmosphere, a cylinder portion being formed in said valve body and being connected to said opening, a piston being contained in said cylinder portion in a freely slidable manner, a containing portion being filled with a soluble material, which is melted at a predetermined temperature or higher, and being constructed such that a capacity thereof being reduced by moving of said piston, a connecting path connecting said containing portion and an outside of said valve body, an energizing means being inserted between said piston and said valve body for energizing said piston in a direction for that the capacity of said containing portion is reduced, an exhausting path connecting said cylinder portion and said outside of the valve body and becoming in an open condition when said piston moves in a direction for that the capacity of the containing portion is reduced, an air space being formed between a closed end portion of said cylinder and said piston, a first gas pressure receiving surface being formed at one of end portions of said piston and receiving a gas pressure from said container side and a second gas pressure receiving surface being formed at another one of end portions of said piston and receiving a gas pressure from said air space side, and a path connecting said airspace and said cylinder portion which exists at an opening side with respect to said piston.

The present invention has an aspect in that said path is formed inside of said piston and opens to said first and second gas pressure receiving surfaces, respectively.

The present invention has another aspect in that said first and second gas pressure receiving surfaces have the same area.

Further, the present invention has still another aspect in that said energizing means has an energizing force more than a frictional resistance between said piston and said cylinder portion and necessary to push the melted soluble material out.

DETAILED DESCRIPTION OF THE PREFERRED EMBODIMENTS

Preferred embodiments of the present invention will be explained in detail, referring to the attached drawings.

Figure 1:
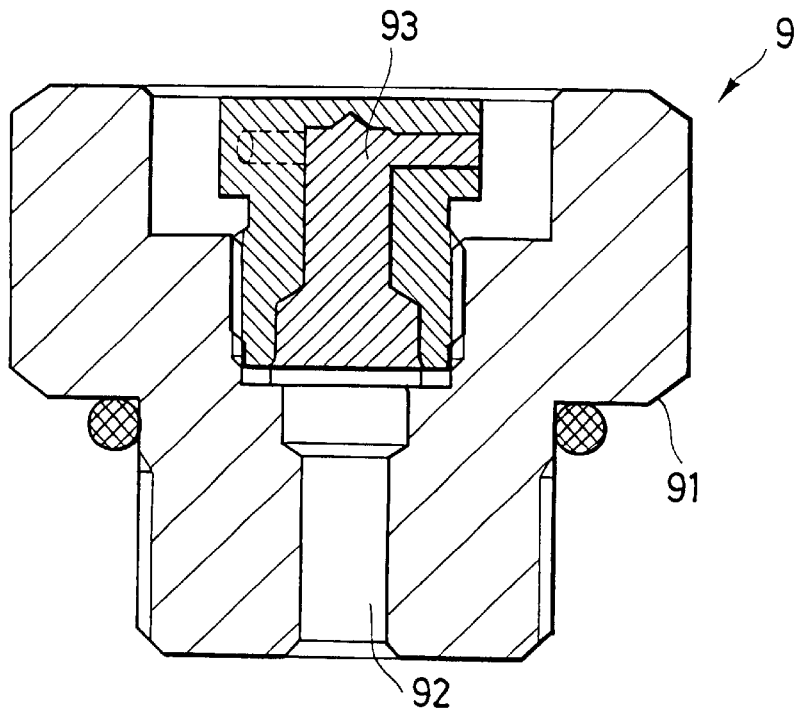
FIG. 1 is a cross sectional side view showing a construction of a conventional safety valve.
Figure 2:
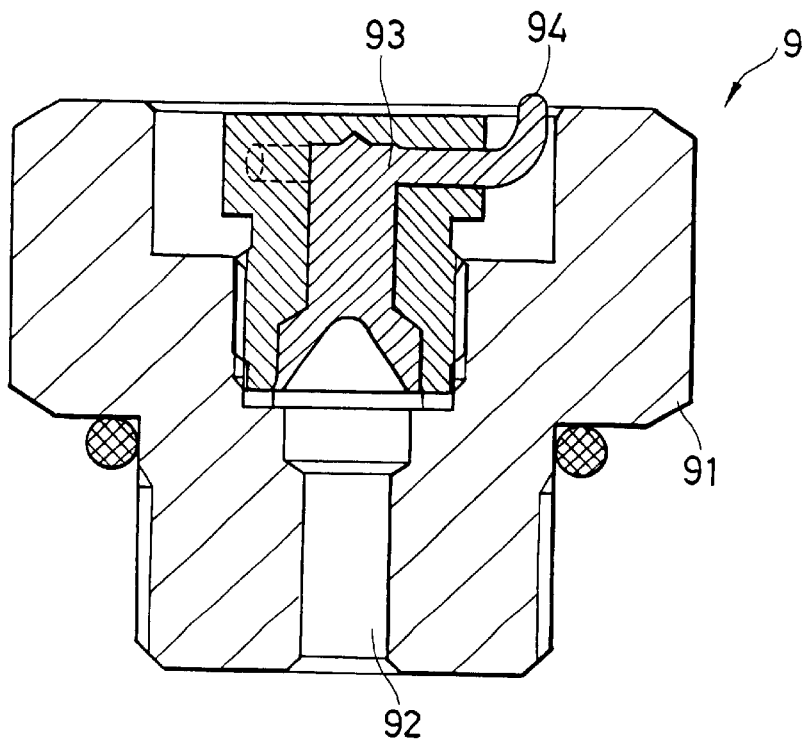
FIG. 2 is a cross sectional side view depicting a construction of a conventional safety valve, where creep is generated.
Figure 3:
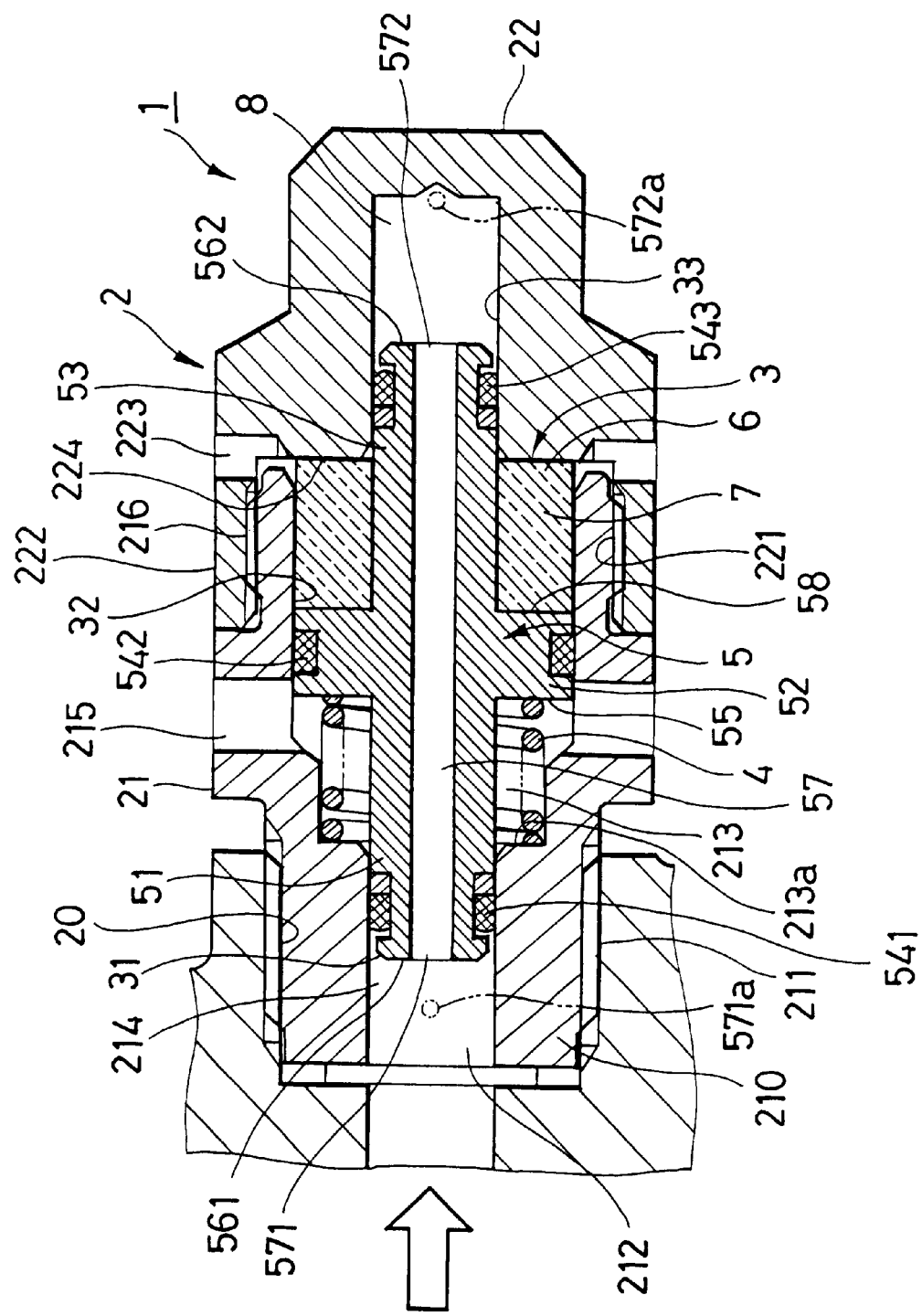
FIG. 3 is a cross sectional side view illustrating a construction of a safety valve according to the present invention, which is in a non-operational condition.
Figure 4:
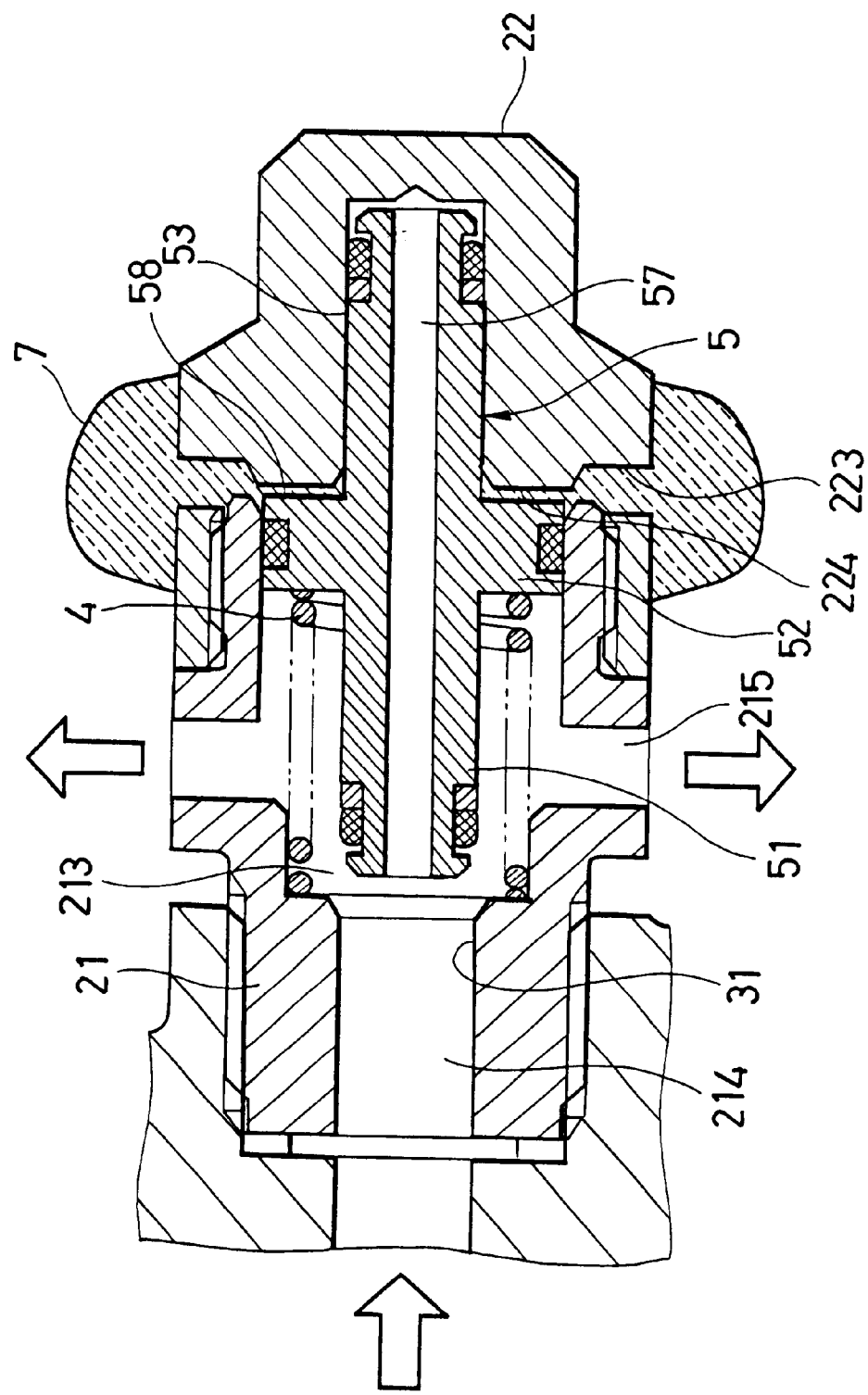
FIG. 4 is a cross sectional side view representing a construction of a safety valve according to the present invention, which is in an operational condition.

FIG. 3 is a cross sectional side view showing a construction of the safety valve according to the present invention in a normal and in a non-functional condition; and FIG. 4 is also a cross sectional side view of the safety valve but in a functional condition.

The safety valve 1 is attached to a fuel tank for an engine which works with a natural gas as a fuel, or the valve 1 is connected to a fuel flow path being connected to a fuel tank at a position within a range where the temperature of the fuel tank is sufficiently transmitted to the safety valve. In order to prevent an explosion of the fuel tank when the inner pressure of the tank increases due to an increase of the temperature of the tank, the safety valve has a function that when the temperature of the tank increases to a predetermined temperature the valve functions (opens) to exhaust the gas inside the fuel tank to the outside.

The safety valve 1 comprises a valve body 2, a piston 5 contained in the valve body 2, a soluble alloy 7 as a soluble material which is filled between the piston 5 and the valve body 2, and a spring 4 as an energizing means which is inserted between the piston 5 and the valve body 2.

The valve body 2 comprises a base body 21 and a cap body 22. The base body 21 comprises: a connecting portion 210 where a male screw portion 211, which is to be threaded with a connecting hole 20 at a fuel tank side, is formed; an opening 212 formed at a top end of said connecting portion 210; a cylinder portion 3 formed at an opposite end of said opening 212; a spring containing portion 213 for containing said spring 4 which is formed between said opening 212 and said cylinder portion 3; a gas flow path 214 connecting said opening 212 and said cylinder portion 3; a gas exhausting path 215 connecting an outer surface of said base body 21 and an inner circumferential surface of said cylinder portion 3; and a female screw portion 216, which is to be threaded with said cap body 22, formed on an outer circumferential surface of said cylinder portion 3.

The cylinder portion 3 has a first cylinder 31 whose inner diameter is small and a second cylinder 32 whose inner diameter is large; the first cylinder 31 and the second cylinder 32 are provided on a common axis being connected together. Between the first cylinder 31 and the second cylinder 32, the spring containing portion 213 is formed. The spring containing portion 213 has a step portion at the opening 212 side thereof; the step portion works as a spring receiving surface 213a. When the valve is opened, the first cylinder 31 is connected to the gas exhausting path 215 and functions as a gas flow path 214.

The cap body 22 comprises a third cylinder 33 constituting of the cylinder portion 3, a cylindrical connecting portion 222 and a connecting path 223. In the cylindrical connecting portion 222, a female thread portion 221 is formed, which is fitted to the male screw portion 216 of the base body 21. The connecting path 223 connects the inside and the outside of the connecting portion 222. According to the first embodiment, the inner diameter of the first cylinder 31 and the inner diameter of the third cylinder 33 have the same dimension.

The valve body 2 is completed by fitting the base body 21 and the cap body 22 together, which is performed by threading the male screw portion 216 to the connecting portion 222 of the cap body 22. The piston 5 is contained in the cylinder portion 3. The piston 5 comprises three slidable portions. That is to say, the piston 5 comprises a first slidable portion 51 and a third slidable portion 53 which are contained in the first cylinder 31 and the third cylinder 33, respectively, and further comprises a second slidable portion 52 which is contained in the second cylinder 32 and formed between said first slidable portion 51 and the third slidable portion 53. The second slidable portion 52 has a larger diameter than those of the first and third slidable portions. At the top end of the first slidable portion 51, is formed a first pressure receiving surface 561; and at the top end of the third slidable portion 53, a second pressure receiving surface 562 is provided, respectively. The piston 5 is arranged to be freely slidable in the cylinder portion 3 and works as a balanced piston where a gas pressure is applied to the first pressure receiving surface 561 and the second pressure receiving surface 562, which are formed at both ends of the piston, respectively.

Further, the piston 5 comprises a path 57 which has openings 571 and 572 in the center portions of the first pressure receiving surface 561 and the second pressure receiving surface 562, respectively. In the first embodiment, the diameters of the first cylinder 31 and the third cylinder 33 have the same size, so that the areas of the first receiving surface 561 and the second receiving surface 562, against which a gas pressure is applied, are also the same size.

On the outer circumferential surfaces of the slidable portions 51, 52 and 53, O-rings 541, 542 and 542 are provided as a sealing member, respectively. The step formed between the second slidable portion 52 and the first slidable portion 51 works as a spring receiving surface 55. The spring 4 is mounted on the outer side surface of the first slidbale portion 51 and inserted between the spring receiving surface 213a and the spring receiving surface 55 in a compressed condition. The energizing force of the spring 4 is strong enough to overcome the friction of the three O-rings and is able to sufficiently perform movement of the piston 5 at the energizing force weakest level.

Next, the containing portion 6 for containing the soluble alloy 7 will be explained. The containing portion 6 is constructed such that the capacity thereof becomes small when the piston 5 is moved by the energizing force of the spring 4. The space formed between the piston 5 contained in the cylinder portion 3 and the second cylinder portion 32 is the containing portion 6. That is to say, the containing portion 6 exists between an urging surface 58 at a moving side, which is constituted of a step portion formed between the second slidable portion 52 and the third slidable portion 53, and an urging surface 224 at a fixed side, which is formed on the cap body 22 side in an opposite position to said urging surface 58 at the moving side. In the containing portion 6, the soluble alloy 7 is filled. Further, the containing portion 6 is connected to the outside of the valve body 2 through the connecting path 223.

Due to the existence of the containing portion 6, the third slidable portion 53 becomes in a retreated condition from the third cylinder 33, so that an air space 8 is formed at the top end of the second gas pressure receiving surface 562 in the third cylinder 33. The gas pressure in the air space 8 becomes the same as that in the gas tank because of the existence of the path 57.

The function of the above-mentioned safety valve 1 according to the invention will be explained.

The safety valve 1 is closed when the valve 1 is attached to the fuel tank under a non-functional normal condition. The piston 5 is constantly urged into a direction to open the valve by the energizing force of the spring 4. The soluble alloy 7 is provided between the piston 5 and the valve body 2 and works as a stopper to prevent movement of the piston 5.

In such a condition, the gas pressure is applied to the first gas pressure receiving surface 561 and the second gas pressure receiving surface 652 of the piston 5 from reversed directions. Therefore, there is no force to move the piston due to the gas pressure. The force to move the piston due to the gas pressure is never caused without respect to any increase of the gas pressure. That is to say, only the energizing force by the spring is applied to the piston 5. The energizing force is applied to the piston with respect to the gas pressure in the tank. The energizing force by the spring 4 is set to be sufficient to move the piston 5 but to be the smallest in the range that the piston 5 is moved, so that the force being applied to the soluble alloy 7 is not so strong as to generate creep.

As mentioned above, no urging force due to the gas pressure is applied to the soluble alloy 7, so that it is not necessary to take a gas pressure into consideration. Therefore, it is also not necessary to make the cross sectional area of the gas flow path 214 small, through which a gas goes out when exhausting, and thus the cross sectional area can be made sufficiently large. It means that the cross sectional area of the gas flow path 214, through which a gas goes out when being exhausted, can be made large without making the size of the safety valve itself large. That is to say, according to the invention, the safety valve can be arranged compact in size and then it can be easily attached to even in a small space for the safety valve like that of a fuel tank of automobiles.

When the temperature in the fuel tank increases, in addition to the increase of the temperature of the safety valve 1, the temperature of the soluble alloy 7 also increases. When the temperature of the soluble alloy 7 becomes to a predetermined temperature, the alloy 7 is melted. By the melting of the alloy 7, the piston 5 is pressed and inserted with the aid of the energizing force of the spring 4 so as to move the urging pressure surface 58 located at the moving side to the direction of the urging surface 224 located at the fixed side. As shown in FIG. 4, the soluble alloy 7 is pushed out from the valve body 2 through the connecting path 223 by the movement of the piston 5.

At the same time, in accordance with the movement of the piston 5, the first slidable portion 51 comes out of the first cylinder 31; the gas flow path 214 and the gas exhausting path 215 are connected together via the spring containing portion 213, so that the gas in the fuel tank is exhausted. By the opening operation of the safety valve 1, the gas pressure in the fuel tank decreases.

The present invention is not limited to the above-mentioned embodiment, but there are many other alternatives. In addition to the above, it may be possible to arrange such that the area of the first gas pressure receiving surface 561 is different from that of the second gas pressure receiving surface 562 by making a difference between the diameters of the first cylinder 31 and the third cylinder 33. By such an arrangement that the area of the first gas pressure receiving surface 561 is larger than that of the second gas pressure receiving surface 562 to adjust the force due to the gas pressure applied to the piston 5, it may be possible to enhance the energizing force of the spring 4. In accordance with this an arrangement, it becomes possible to make the spring 4 small in size and thus the size of the safety valve becomes smaller.

Further, it may also possible to arrange such that the gas flow path 57 is provided in the valve body side instead in the piston 5. For instance, it may have a construction as shown by a broken line in FIG. 3 that openings 571a and 571b are provided in the deepest portion of the space 8 and in the gas flowing path 214, respectively, to make a bypass in the valve body 2.

Figure 5:
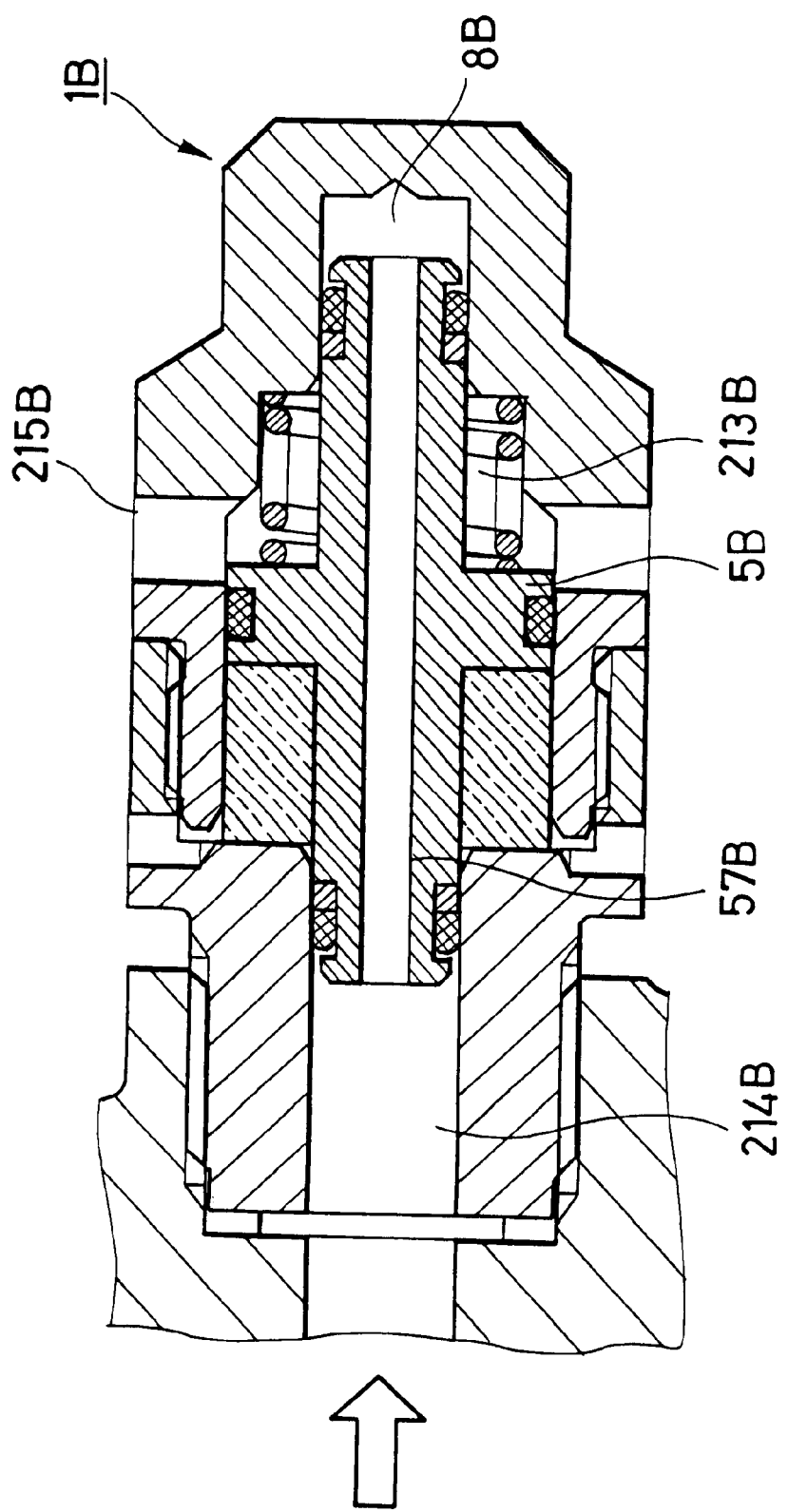
FIG. 5 is a cross sectional view showing a construction of a safety valve according to another embodiment of the present invention.

It may also be possible to arrange the safety valve as shown in FIG. 5 so that the operating direction of the piston 5B becomes opposite. In this case, when the valve 1 is open, the space 8B and the gas exhausting path 215B are connected together by the movement of the piston 5B, so that the gas in the tank is exhausted through the gas flow path 214B, the path 57B, the space 8B, the spring containing portion 213B, and the gas exhausting path 215B, in this order.

The safety valve explained in the above is used in a fuel tank for natural gas as a fuel for automobiles, however, it can also be used for other gas or other gas tanks.

According to the safety valve of the present invention, it is possible to adjust the force due to the gas pressure applied to the soluble material, because the gas pressure is applied to the piston from opposite directions. Therefore, creep is not apt to be generated and then the safety valve shows a stable function for a long term.

In case the safety valve is used in a fuel tank for automobiles, for instance, even if the valve is used in a condition that the temperature of the atmosphere around the valve is very high, it can be restricted to generate a creep and the valve can be used for a long time period.

Further, according to the second aspect of the present invention, the safety valve can be made compact in size by providing a bypath in the piston. This is particularly useful to mount the safety valve to automobiles which do not have sufficient space therefor.

According to the third aspect of the present invention, by the arrangement that the areas of the first and second gas pressure receiving surfaces are the same, only an energizing force form the energizing means via the piston is applied to the soluble material but no force due to a gas pressure. Therefore, the force applied to the soluble material comes only from the energizing force by the energizing means, which is kept constant without respect to the increase of the gas pressure. Therefore, incidence of the creep is more restricted.

According to the fourth aspect of the present invention, it is possible to select the smallest force to move the piston in a range of force necessary to move the piston, and the pressure to the soluble material is applied with the selected smallest force. Therefore, creep is less apt to be generated.

What is claimed is:

1. A safety valve to be attached to a gas flow path in a gas container mounted on a movable body or in the vicinity of the gas container comprising:

a valve body comprising an opening portion which opens to a gas atmosphere;

a cylinder portion being formed in said valve body and being connected to said opening portion;

a piston being contained in said cylinder portion in a slidable manner;

a containing portion being filled with a soluble material which is melted at a predetermined temperature or more and being constituted such that a capacity thereof is reduced by a movement of said piston;

a connecting path connecting said containing portion and an outside of said valve body;

an energizing means for energizing said piston in a direction that the capacity of the containing portion is reduced and being inserted between said piston and said valve body;

a gas exhausting path connecting said cylinder portion and said outside of the valve body and becoming in an open condition when said piston moves to the direction that the capacity of the containing portion is reduced;

an air space being formed between a closed end portion of said cylinder portion and said piston;

a first gas pressure receiving surface to which a gas pressure is applied from a gas container side and a second gas pressure receiving surface to which a gas pressure is applied from said airspace side, being formed at both ends of said piston, respectively;

a path connecting said airspace and said cylinder portion at an opening portion side with respect to said piston.

2. A safety valve according to claim 1, wherein said path is formed in said piston and opens to said first gas pressure receiving surface and said second gas pressure receiving surface, respectively.

3. A safety valve according to claim 2, wherein said first and second gas pressure receiving surfaces have the same area.

4. A safety valve according to claim 3, wherein said energizing means has an energizing force more than a frictional resistance between said piston and said cylinder portion and necessary to push the melted soluble material out.

* * * * *